July 9, 1963 K. ŠTĚPÁNEK 3,096,590
METHOD OF MEASURING THE UNIFORMITY OF GEARINGS
Filed Oct. 13, 1959
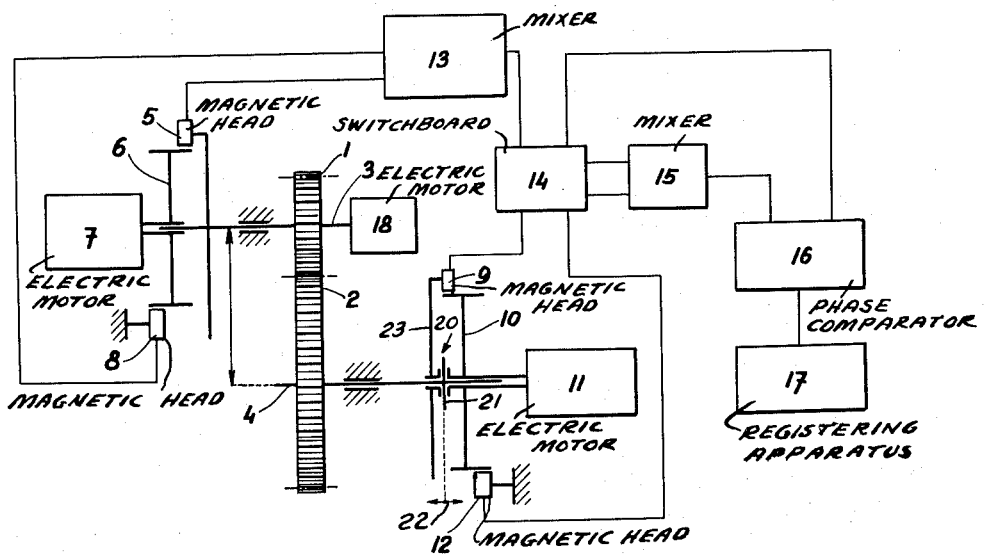
INVENTOR.
Karel Štěpánek
BY though the driver member 21 is in its 3,096,590
METHOD OF MEASURING THE UNIFORMITY OF GEARINGS
Karel Štěpánek, Prague, Czechoslovakia, assignor by mesne assignments to W. E. Sykes Limited, Manor Works Staines, Great Britain
Filed Oct. 13, 1959, Ser. No. 846,114
2 Claims. (Cl. 33—179.5)

This invention relates to a method of measuring the uniformity of gears and to apparatus for performing the method.

The uniformity of a train of transmission gears constitutes the basic characteristic of its quality. Especially in the case of gearing, the measurement of the uniformity (single-flank rolling) is the best method for assessing the value of transmission gears. The hitherto known methods for measuring the single-flank rolling have a rather limited range of application. The gearing to be measured is usually compared with a pair of friction gears and the apparatus measures the deviations of the gearing under measurement (toothed gears) from the ideal (friction) gearings. For each train of gears, and in some cases also for each diameter of the gears, it is necessary to prepare special friction rollers of high precision. This represents the chief drawback of these methods and constitutes an obstacle to their wider application.

The invention hereafter disclosed provides a new method for measuring the uniformity of motion of gear trains (single-flank rolling) which is suitable for universal application to any gears and diameters of gear wheels at a far higher degree of accuracy than hitherto available. The basic measuring elements are recorded magnetic tracks whose characteristics and preparation are well known.

According to the invention there is provided a method of measuring the precision of a gear train by the use of two rotary carriers bearing recorded magnetic tracks, the recorded track on one carrier being produced by transmitting the recorded track of the other carrier with the cooperation of the gear train to be measured.

A specific embodiment of the invention will be described by way of example with reference to the accompanying drawing which illustrates the measuring of spur gears by the single-flank rolling method.

The gears 1 and 2 to be measured having, say, a transmission ratio of 1:2 are fixed on respective shafts 3 and 4, the radial distance of said shafts being adjusted to suit the diameters of the gears to be measured.

On the shaft 3 is furthermore fixed a magnetic head 5 for reading a pre-recorded magnetic track on a cylindrical carrier 6 rotated by the tubular output shaft of an electric motor 7 about the axis of the shaft 3. This cylindrical carrier 6 is arranged on a metal wheel provided on its cylindrical surface with a suitable coating layer adapted for receiving a magnetic record, and carries two identical records placed axially side-by-side. The other recorded magnetic track is read by a stationary magnetic head 8.

A friction clutch 20 has a driver member 21 secured on the shaft 4 for joint rotation. The driver member 21 is axially movable on the shaft 4 between two positions as indicated by the double arrow 22. The part of the apparatus connected to the gear 2 by the shaft 4 is analogous to the apparatus associated with shaft 3. A magnetic head 9 is fixed on a holder 23 which can be attached either to the frame of the apparatus in a manner not further illustrated, or coupled to the shaft 4 by the driver member 21 in one axial position of the latter. The cylindrical carrier 10 is mounted rotatably on the shaft 4 and is adapted to be driven either by the auxiliary electric motor 11, or by the shaft 4 when the driver member 21 is in its other axial position. The magnetic head 9 reads or records one track on the carrier 10 whereas a stationary head 12 reads or records another track.

A basic feature of the invention resides in the use of a carrier 6 having recorded thereon a magnetic track of a predetermined number of oscillations, for example, 5000. Their wavelength is precisely uniform. This recorded track is used as a standard for the measurement of all gear trains. For each measurement of a gear train, the recorded track on the carrier 6 is played back and recorded on the other carrier 10 which is driven by the gear train being measured. Therefore, the recorded track on the magnetic carrier 6 is the same for measurement of the uniformity of any gear train whilst the recorded track on the carrier 10 is produced individually for each gear train measured by playing back the recorded track from the magnetic carrier 6 and recording it on the carrier 10 while the same is being driven by the gear train which is being measured.

The measurement of a gear train comprises two principal phases:

(1) *Playing back the recorded track.*—The gearing to be measured is rotated at a slow speed. For example, the shaft 3 is rotated once every 100 seconds by the motor 18. The magnetic head 9 initially is fixed on the frame of the apparatus and the drum 10 is connected with the shaft 4. The drum 6 is rotated by the motor 7 at any convenient speed, such as 10 revolution per second. On the drum 6 there is recorded a predetermined number of magnetic oscillations (for example 5000) whose wavelength is precisely uniform. This record is permanent and is used for the measurement of all gearings. When the drum 6 is rotated at the speed of 10 revolutions per second, a signal is induced in the pick-up head 8. The signal has a frequence given by the number of oscillations on the drum 6 and by the speed of rotation of the drum. In the present numerical example, the frequence is 50,000 cycles per sec. In the pick-up head 5 a signal is induced, the frequency of which is determined by the number of oscillations on the drum 6 and by its speed relative to the shaft 3. In the present case, if the drum 6 rotates at 10 revolutions, and the head 5 rotates in the opposite direction at one hundredth of a revolution per second, a frequency of 50,050 cycles per sec. is obtained. Both signals (from the heads 5 and 8) are fed to the mixer 13 wherefrom a signal at the frequency difference is obtained, that is, at 50,050—500,000=50 c.p.s. This difference frequency is determined by the number of oscillations on the drum 6 and the speed of the shaft 3, and is independent of the rotary speed of the drum 6. The 50 cycle signal obtained is fed to the magnetic heads 9 and 12 by way of a switchboard 14.

On the drum 10 there is produced in this manner a magnetic record having two identical tracks. Since the drum 10 is connected with the shaft 4 for rotation therewith, the number of oscillations of this record is determined by the number of oscillations on the drum 6 as well as by the gear ratio between the gears 1, 2 under measurement. For example, with 5000 oscillations and a gear ratio of 1 to 2, 10,000 oscillations are recorded on the circumference of the drum 10 during one revolution which takes 200 seconds. Obviously, this record lacks uniformity because of the inaccuracy of the gearing.

(2) *Measurement of the uniformity of the gearing.*—The gears to be measured are rotated at a slow speed as during transmission of the magnetic record. The arrangement of the measuring equipment on the shaft 3 (speed of the head 5 and of the drum 6) is the same as for the transmission of the magnetic record. The magnetic head 9, however, is coupled mechanically with the shaft 4, and the drum 10 is disengaged from this shaft and is rotated by an auxiliary electric motor 11 at a speed of, for example, 10 revolutions per second. In the heads 9 and 12, there are thus induced signals of different frequencies which are fed to the frequency discriminator 15 to produce an output of a frequency equal to the difference of the input frequencies. This difference is again determined by the number of oscillations on the drum 10 and by the speed of the shaft 4. In view of the fact that this number of oscillations is twice the number of oscillations on the drum 6 and the speed of the shaft 4 is half that of the shaft 3, the frequency of the signal of the head 12 is $10 \times 10,000 = 100,000$ cycles per sec., and the signal frequency of the head 9 which rotates in a direction opposition to that of the drum 10 is $$100,000 + \frac{1}{200} \times 10,000 = 100,050$$

cycles per sec. The magnetic track on the drum 6 induces in the head 8: $(10 \times 5000) = 50,000$ cycles per sec. and at rotation in a direction opposite to that of the head 5, a frequency of 50,050 is induced in this head. The difference amounts in both cases to 50 cycles.

The frequency difference of the signals from the heads 5 and 8 which are connected to the mixer 13 produces an output signal of 50 cycles per second from the latter which signal is fed over the switchboard 14 to a phase comparator 16 which also receives the output from the mixer 15. The latter output has a frequency corresponding to the frequency difference of the signals from the heads 9, 12, that is, of 50 cycles per second.

The output of the phase comparator 16 is recorded by the registering apparatus 17. The phase angle of the two input signals at the phase comparator 16 fluctuates periodically during each revolution of the drum 10 owing to lack of uniformity of its record. The periodicity of these fluctuations is determined by the speed of rotation of the drum, in the instant case, 10 revolutions per sec. Moreover, the phase angle between the phase comparator inputs varies due to the lack of uniformity of the gearing. The heads 5 and 9 do not rotate accurately at a speed ratio of 1:2 because of the lack of uniformity of the gearing. This phase angle variation is cyclic at a frequency of $\frac{1}{200}$ cycle per second corresponding to the rotary speed of the head 9. If therefore the registering apparatus 17 is arranged to record only frequencies from 0 to 5 cycles per second, a frequency of 10 cycles per second will no longer be recorded and the influence of the lack of uniformity of the magnetic record on the drum 10 will thereby be eliminated. The record of the apparatus 17 then corresponds to the sum error of the gearing under measurement. As one revolution of the shaft 4 takes 200 sec., and the apparatus 17, which registers the sum error of the gearing under measurement, has a frequency range of 0 to 5 cycles per second, it can register an error which changes $200 \times 5 = 1,000$ times during one revolution of the shaft 4, that is, 1,000 times during one revolution of the gearing under measurement. The apparatus in this numerical example indicates all harmonic components of non-uniformity in the range from 0 to 1000.

From the foregoing description it is apparent that the apparatus for measuring single-flank errors based on the principle of the invention is universally applicable to the measuring of any gears of any diameter and any transmission ratio.

It is necessary that the number of oscillations printed on drum 6 multiplied by the number of teeth in gear 2 and divided by the number of teeth in gear 1 be an integer. This condition results from the requirement that an integral number of magnetic oscillations is to be recorded on the circumference of the drum 10, that is, the record must be continuous.

As single flank measurement is always carried out with a couple of engaging gears, these gears may be a wheel and pinion where it is required to know the error of the pair, or one may be a master gear and the other a gear to be measured.

In the latter case, to ensure that there is an integral number of oscillations recorded on the circumference of the drum 10 for any number of teeth in the gear to be measured, it is necessary that the number of teeth in the master gear (gear 1) be an integral fraction of the number of oscillations on the drum 6. In the given case, the number of teeth may be, for example, 5, 8, 10, 20, 25, 40, 50, etc.

The degree of precision of the measurement is determined by the magnitude of the wavelength of the recorded magnetic track and by the accuracy of the phasemeter. Thus, for example, in the instant case, the drum 10 holds 10,000 oscillations so that with an accuracy of the phasemeter of 2.5° of phase angle, it is possible to measure one part of the circumference in 1,440,000 parts which is an accuracy better than 1 angular second. On a wheel of a diameter of 200 mm. this value corresponds to a length smaller than 0.5 micron. It will be understood that the influence of inaccuracies of the bearings may be eliminated by using the method of pick-up by systems of heads.

I claim:

1. In an arrangement for measuring the precision of a gear train, in combination, a gear train having an input shaft and an output shaft; means for rotating one of said shafts; a first magnetic record of a periodic signal; means for moving said record; a stationary first magnetic head arranged for reading said record when said record is moved; a second magnetic head connected to one of said shafts for reading movement therewith relative to said record; mixer means connected to said magnetic heads for producing a first output signal responsive to the frequency difference of the readings of said heads; a magnetic record carrier; means for releasably connecting said carrier to the other one of said shafts for joint movement therewith; means for producing a second magnetic record on said carrier responsive to said output signal; releasable motor means for moving said carrier when released from said other shaft; a stationary third magnetic head arranged for reading said second magnetic record when the same is moved by said releasable motor means; a fourth magnetic head; means for connecting said fourth head to said other shaft for reading movement therewith relative to said second record; mixer means connected to said third and fourth magnetic heads for producing a second output signal responsive to the frequency difference of the readings of said third and fourth heads; and means for comparing said output signals.

2. A method of measuring the precision of a gear train including an input member and an output member, which method comprises:

(a) moving said input member at a predetermined input speed, whereby said output member moves at a corresponding output speed;

(b) rotating a first substantially circular magnetic record of a predetermined number of signals at a speed substantially greater than said input speed;

(c) producing a first cyclic signal responsive to said predetermined number of signals and said substantially greater speed;

(d) producing a second cyclic signal responsive to said predetermined number of signals and the difference between said input speed and said substantially greater speed;

(e) producing a first cyclic difference signal responsive to the difference between said first and second cyclic signals;

(f) recording said first difference signal on a continuous substantially circular magnetic recording medium by recording means while said medium rotates at said output speed relative to said recording means, whereby a second continuous magnetic record of another number of cyclic signals is produced on said medium, said other number and said predetermined number being related by the transmission ratio of said gear train;

(g) rotating said second magnetic record at a speed substantially greater than said output speed;
(h) producing a third cycle signal responsive to said other number of signals and to said substantially greater speed of said second magnetic record;
(i) producing a fourth cyclic signal responsive to said other number of signals and the difference between said output speed and the substantially greater speed of said second magnetic record;
(j) producing a second cyclic difference signal responsive to the difference between said third and fourth cyclic signals; and
(k) comparing said difference signals.

References Cited in the file of this patent
UNITED STATES PATENTS

| | | |
|---|---|---|
| 2,641,088 | Wilcox | June 9, 1953 |
| 2,821,785 | Lekas | Feb. 4, 1958 |
| 2,855,691 | Cunningham | Oct. 14, 1958 |